(12) United States Patent
Zhang et al.

(10) Patent No.: US 8,850,497 B2
(45) Date of Patent: Sep. 30, 2014

(54) EFFICIENTLY DISTRIBUTING VIDEO CONTENT USING A COMBINATION OF A PEER-TO-PEER NETWORK AND A CONTENT DISTRIBUTION NETWORK

(71) Applicants: SplendorStream, LLC, Austin, TX (US); Yale University, New Haven, CT (US)

(72) Inventors: Yin Zhang, Austin, TX (US); Lili Qiu, Austin, TX (US); Yang Richard Yang, New Haven, CT (US)

(73) Assignees: SplendorStream, LLC, Austin, TX (US); Yale University, New Haven, CT (US)

( * ) Notice: Subject to any disclaimer, the term of this patent is extended or adjusted under 35 U.S.C. 154(b) by 53 days.

(21) Appl. No.: 13/741,844

(22) Filed: Jan. 15, 2013

(65) Prior Publication Data
US 2013/0127981 A1 May 23, 2013

Related U.S. Application Data

(62) Division of application No. 13/109,690, filed on May 17, 2011.

(51) Int. Cl.
| | |
|---|---|
| *H04N 7/173* | (2011.01) |
| *H04H 20/08* | (2008.01) |
| *H04N 7/15* | (2006.01) |
| *H04L 29/08* | (2006.01) |

(52) U.S. Cl.
CPC ............. *H04N 7/15* (2013.01); *H04H 20/08* (2013.01); *H04L 67/1085* (2013.01); *H04L 67/1095* (2013.01); *H04L 67/06* (2013.01)
USPC .......................................................... 725/89

(58) Field of Classification Search
CPC .... H04H 20/08; H04L 67/06; H04L 67/1085; H04L 67/1095; H04N 7/15; H04N 7/26707
See application file for complete search history.

(56) References Cited

U.S. PATENT DOCUMENTS

| | | | |
|---|---|---|---|
| 6,961,539 B2 | 11/2005 | Schweinhart et al. | |
| 7,139,313 B2 | 11/2006 | Wang | |
| 7,602,812 B2 | 10/2009 | Mathew et al. | |
| 7,633,887 B2 | 12/2009 | Panwar et al. | |
| 7,733,367 B2 | 6/2010 | Packer | |

(Continued)

OTHER PUBLICATIONS

Office Action for U.S. Appl. No. 13/109,690 dated Jul. 15, 2013.

(Continued)

*Primary Examiner* — Rong Le
(74) *Attorney, Agent, or Firm* — Winstead, P.C.

(57) ABSTRACT

A method, system and computer program product for efficiently distributing video content. A peer-to-peer network and a content distribution network are used in combination to distribute video content. A content distribution network relies on servers distributed across the Internet to achieve high quality content delivery at a high cost. A peer-to-peer network distributes content among peers without incurring server side cost but may experience poor performance. The peer-to-peer network and the content distribution network are leveraged in a manner that achieves high content delivery and low cost by allowing the peer-to-peer network to serve as much content as possible while using the content distribution network to bootstrap the content in the peer-to-peer network and using it as a fallback whenever the peer-to-peer network has insufficient bandwidth, insufficient quality or when the missing piece of video content in the video buffer of the client device has an immediate deadline.

24 Claims, 12 Drawing Sheets

(56) References Cited

U.S. PATENT DOCUMENTS

| | | |
|---|---|---|
| 7,792,982 B2 | 9/2010 | Padmanabhan et al. |
| 7,865,928 B2 | 1/2011 | Hostyn et al. |
| 2007/0011262 A1 | 1/2007 | Kitani et al. |
| 2009/0077254 A1 | 3/2009 | Darcie et al. |
| 2009/0177792 A1 | 7/2009 | Guo et al. |
| 2012/0174167 A1 | 7/2012 | Walters et al. |

OTHER PUBLICATIONS

Written Opinion for International Application No. PCT/US11/36830 dated Aug. 26, 2011.

Office Action for U.S. Appl. No. 13/109,690 dated Nov. 7, 2013, pp. 1-24.

US 8,850,497 B2

EFFICIENTLY DISTRIBUTING VIDEO CONTENT USING A COMBINATION OF A PEER-TO-PEER NETWORK AND A CONTENT DISTRIBUTION NETWORK

CROSS-REFERENCE TO RELATED APPLICATIONS

The present application is a divisional patent application of co-pending U.S. patent application Ser. No. 13/109,690, entitled "Efficiently Distributing Video Content Using a Combination of a Peer-to-Peer Network and a Content Distribution Network," filed May 17, 2011, which is incorporated by reference herein. The present application claims priority benefits to U.S. patent application Ser. No. 13/109, 690 under 35 U.S.C. §121.

TECHNICAL FIELD

The present invention relates to video streaming, and more particularly to efficiently distributing video content using a combination of a peer-to-peer network and a content distribution network.

BACKGROUND

Usage of the Internet for distribution of video is increasing in popularity. Video traffic over the Internet may be broadly classified into three categories: (1) live video streaming; (2) video on demand; and (3) video conferencing. In live video streaming, the video is broadcasted live over the Internet which is watched by participants at approximately the same time. In "video on demand," users can select and watch a video at a particular time and can even forward and rewind the video to an arbitrary offset. In video conferencing, users located at two or more locations are allowed to interact via two-way video and audio transmissions simultaneously.

Each of these services places stringent demands on the content providers, Internet service providers and wireless network providers to service such needs. As a result, it is becoming increasingly difficult for these providers to deliver high quality video content due to their limited network resources.

BRIEF SUMMARY

In one embodiment of the present invention, a method for efficiently distributing video content comprises requesting from a tracker unit to join either an existing live streaming channel, a video on demand streaming channel or a video conference, where the tracker unit is configured to keep track of active peers in a peer-to-peer network. The method further comprises receiving a list of active peers participating in the live streaming channel, the video on demand streaming channel or the video conference from the tracker unit. In addition, the method comprises connecting, by a processor, to a subset of peers in the list provided by the tracker unit to become neighbors in the peer-to-peer network. Additionally, the method comprises receiving a missing piece of video content from one of the neighbors in the peer-to-peer network or from a content distribution network server based on where the missing piece of video content is to be stored in a video buffer. The video buffer comprises a back buffer, a source protection window, an urgent window and a front buffer, where the back buffer comprises recently played pieces of video content. The source protection window comprises pieces of video content whose deadlines are within a first number of pieces from a current play point. The urgent window comprises a second number of pieces of video content after an end of the source protection window. The front buffer comprises a third number of pieces of video content after an end of the urgent window.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for efficiently distributing video content. In one embodiment of the present invention, a peer-to-peer network and a content distribution network are used in combination to distribute video content. A content distribution network relies on servers distributed across the Internet to achieve high quality content delivery at a high cost. A peer-to-peer network distributes content among peers without incurring server side cost but may experience poor performance. The use of both the peer-to-peer network and the content distribution network are leveraged in a manner that achieves high content delivery and low cost by allowing the peer-to-peer network to serve as much content as possible while using the content distribution network to bootstrap the content in the peer-to-peer network and using it as a fallback whenever the peer-to-peer network has insufficient bandwidth, insufficient quality or when the missing piece of video content in the video buffer of the client device has an immediate deadline.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

As stated in the Background section, usage of the Internet for distribution of video is increasing in popularity. Video traffic over the Internet may be broadly classified into three categories: (1) live video streaming; (2) video on demand; and (3) video conferencing. Each of these services places stringent demands on the content providers, Internet service providers and wireless network providers to service such needs. As a result, it is becoming increasingly difficult for these providers to deliver high quality video content due to their limited network resources.

Figure 1:
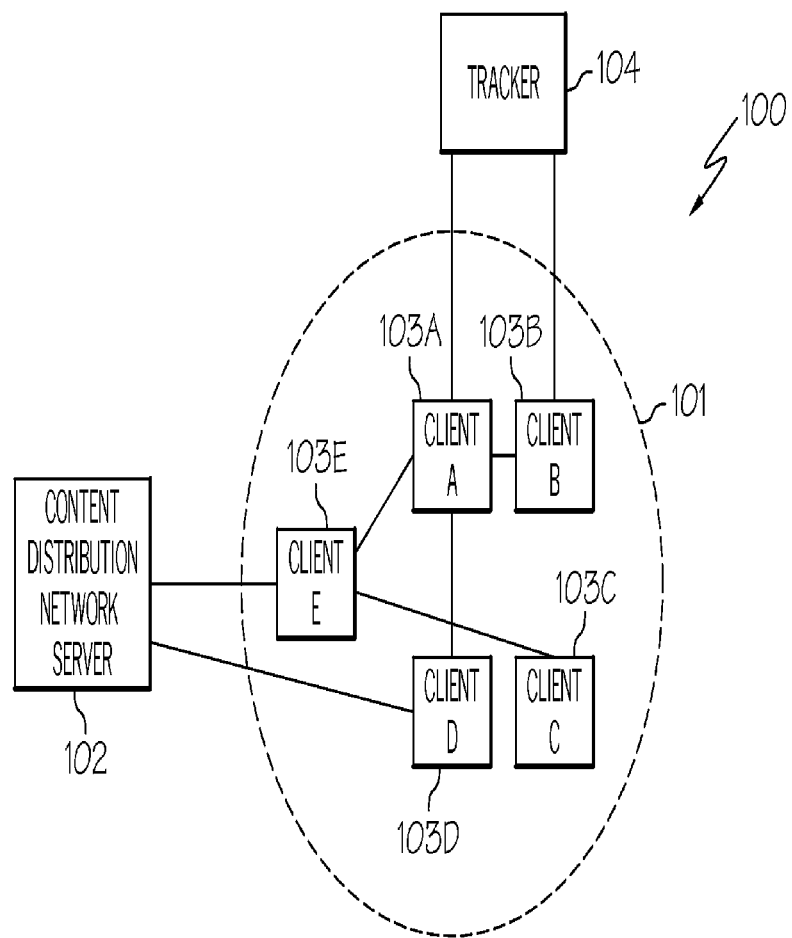
FIG. 1 illustrates a network system that combines the use of a peer-to-peer network with a content distribution network to efficiently distribute video content in accordance with an embodiment of the present invention.
Figure 2:
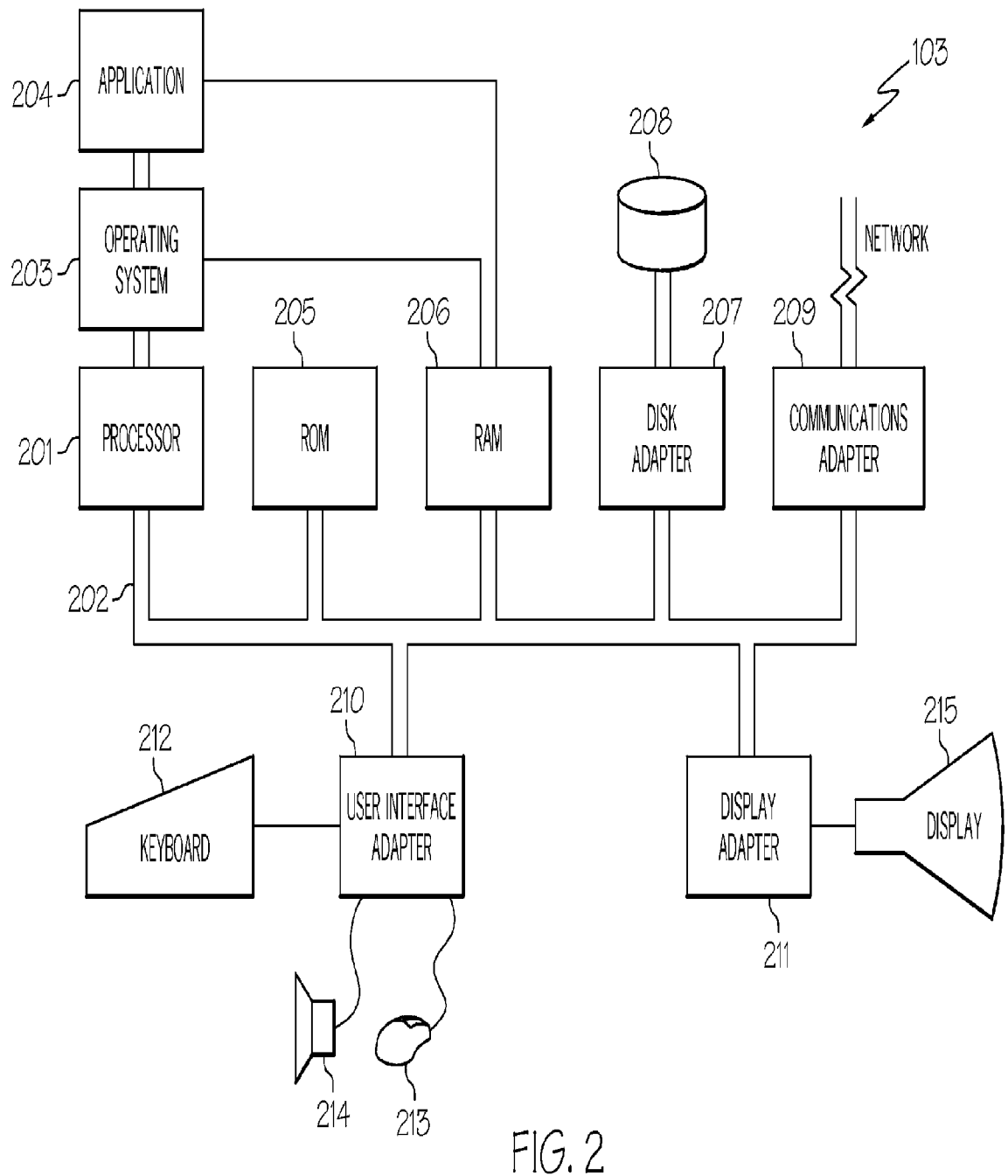
FIG. 2 is a hardware configuration of a client device in the network system in accordance with an embodiment of the present invention.
Figure 3:
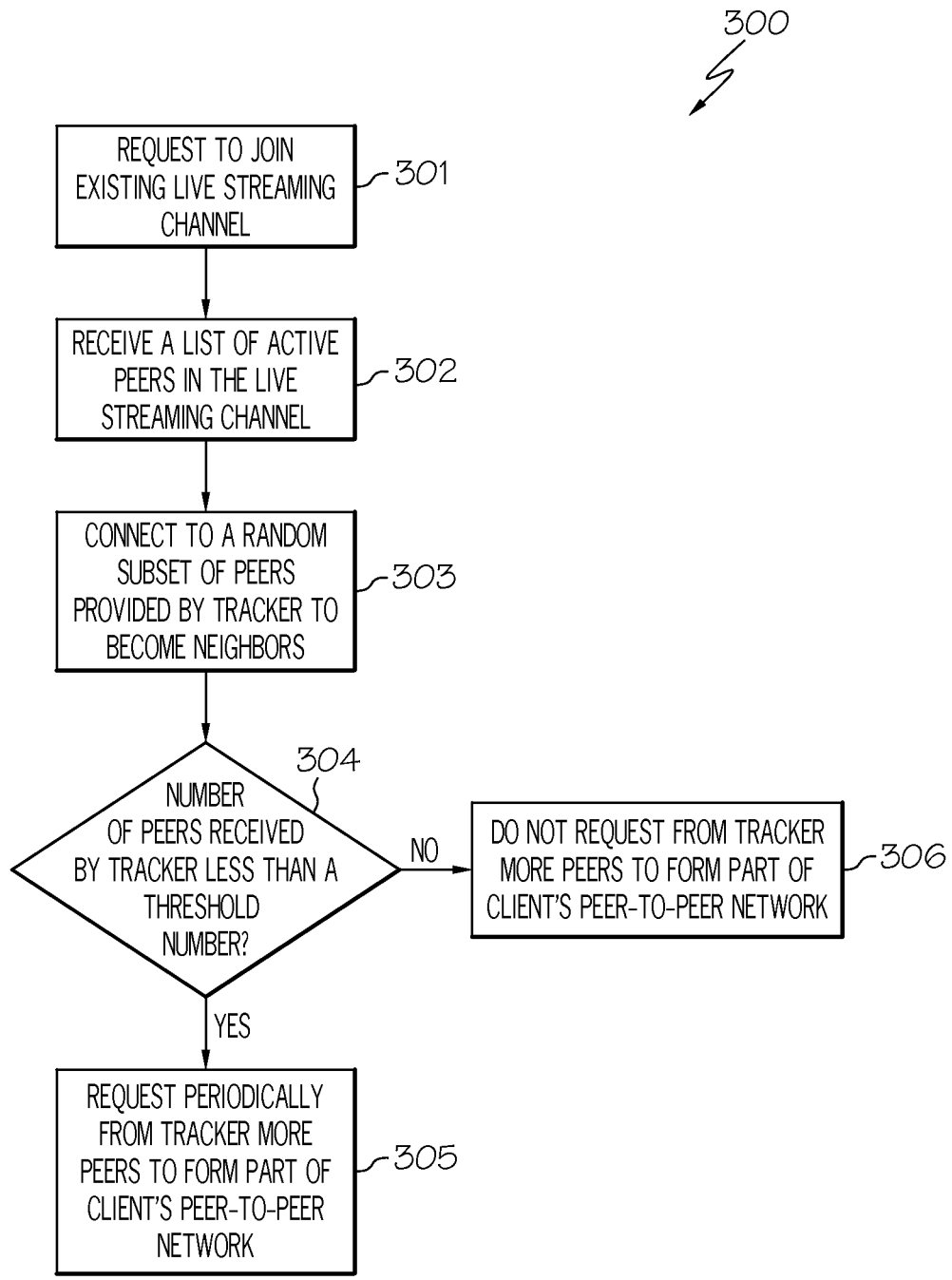
FIG. 3 is a flowchart of a method for joining an existing live streaming channel in accordance with an embodiment of the present invention.
Figure 4:
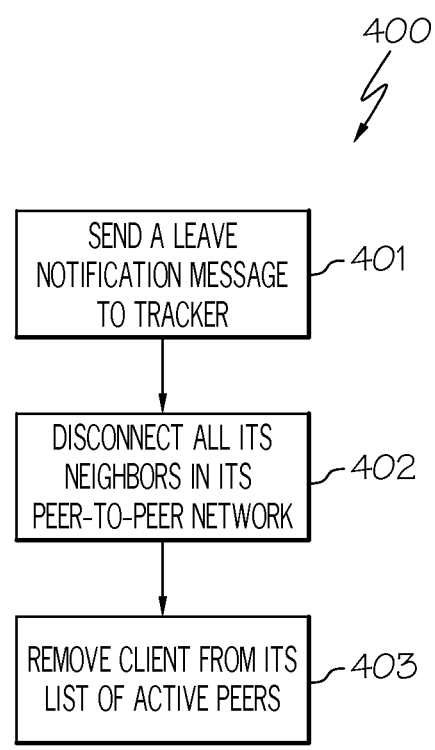
FIG. 4 is a flowchart of a method for leaving an existing live streaming channel in accordance with an embodiment of the present invention.
Figure 5:
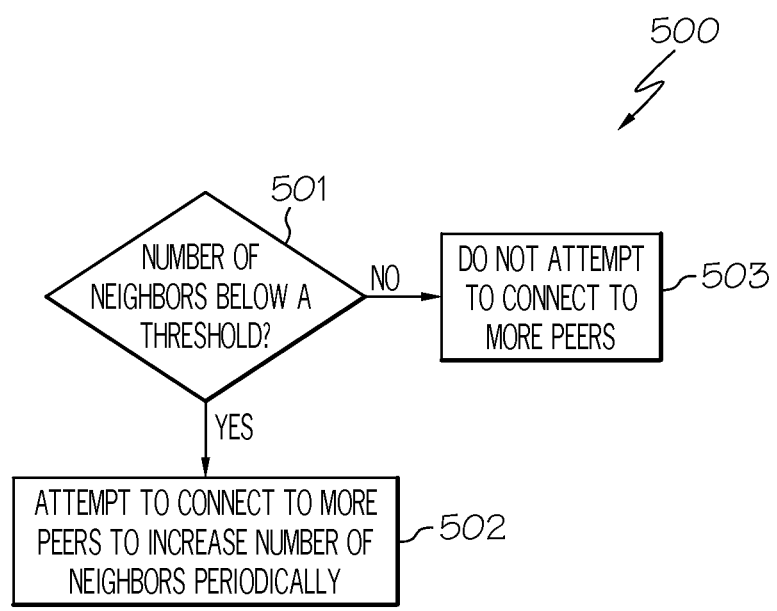
FIG. 5 is a flowchart of a method for adding a new neighbor in a peer-to-peer network by issuing a new connection request in accordance with an embodiment of the present invention.
Figure 6:
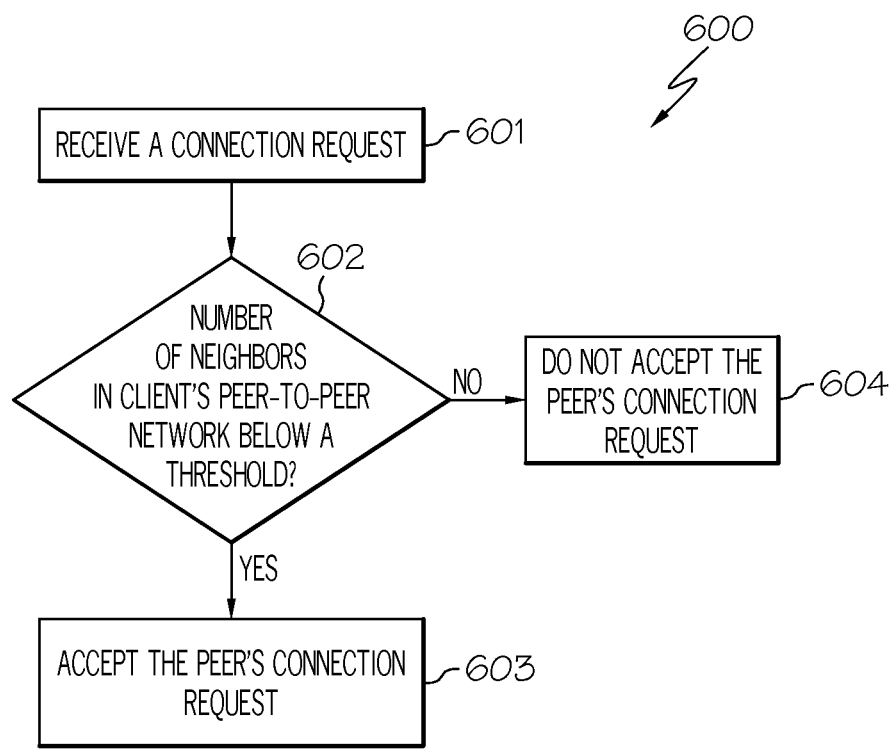
FIG. 6 is a flowchart of a method for handling the connection request discussed in FIG. 5 in accordance with an embodiment of the present invention.
Figure 7:
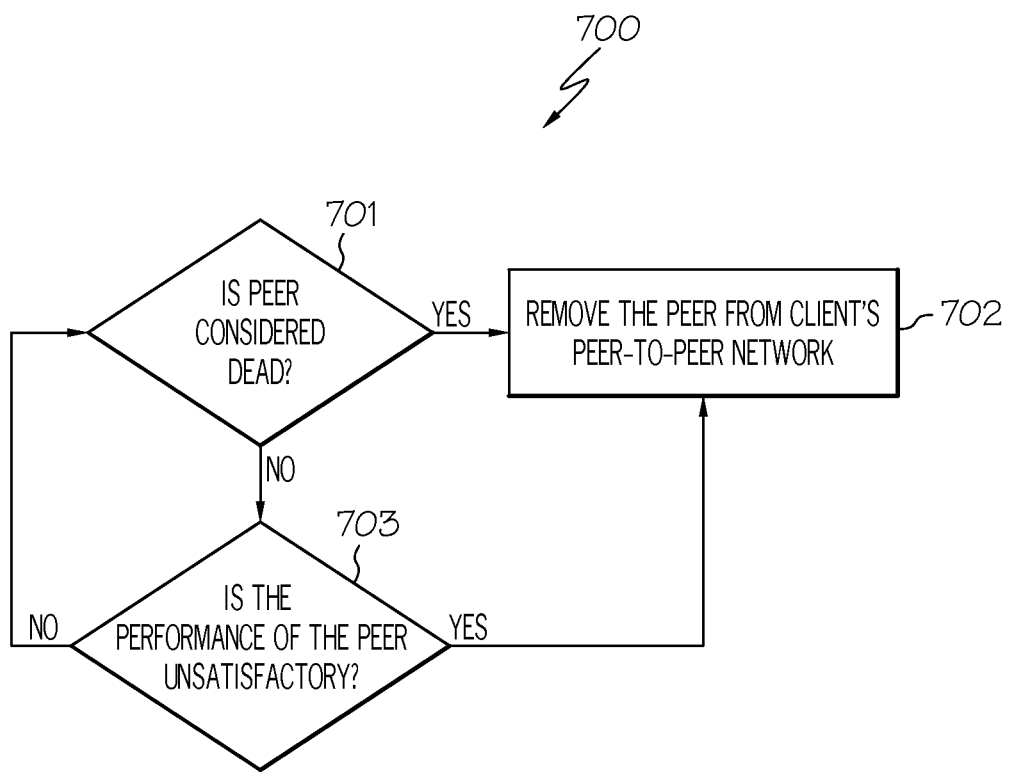
FIG. 7 is a flowchart of a method for removing a new neighbor in a peer-to-peer network in accordance with an embodiment of the present invention.
Figure 8:
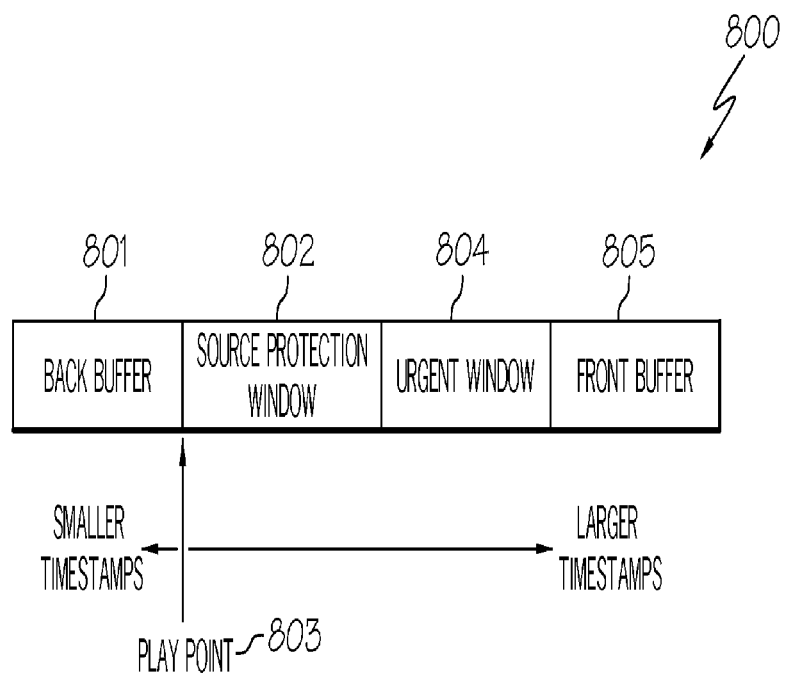
FIG. 8 illustrates a video buffer of the client device in accordance with an embodiment of the present invention.
Figure 9:
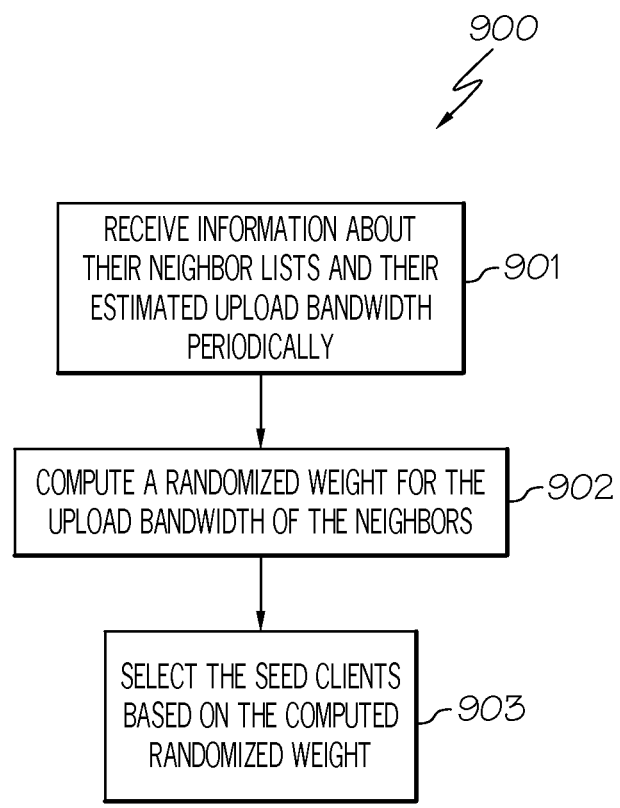
FIG. 9 is a flowchart of a method for randomly selecting seed clients in accordance with an embodiment of the present invention.
Figure 10:
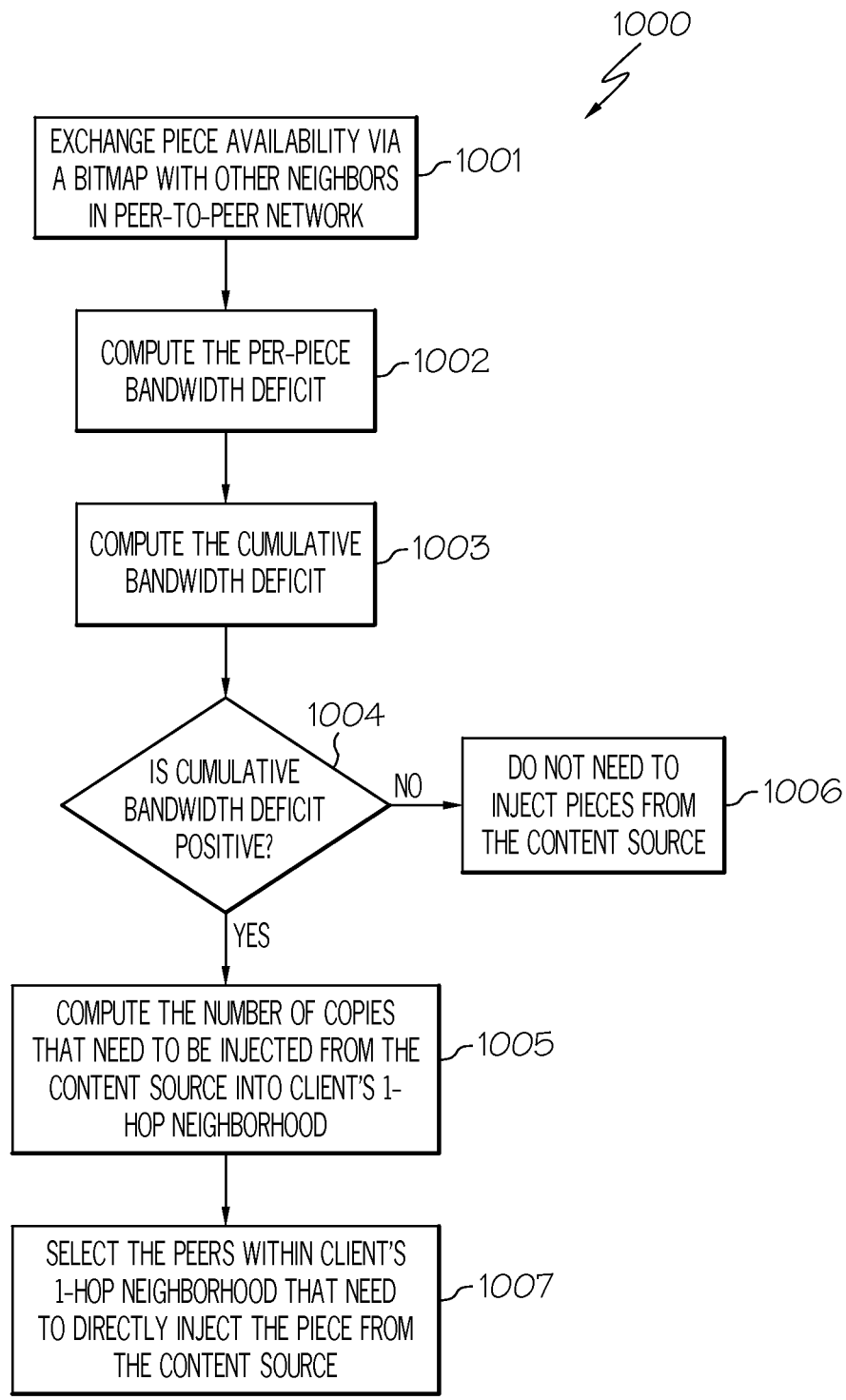
FIG. 10 is a flowchart of a method for injecting pieces from the content source when the peer has insufficient upload bandwidth in accordance with an embodiment of the present invention.
Figure 11:
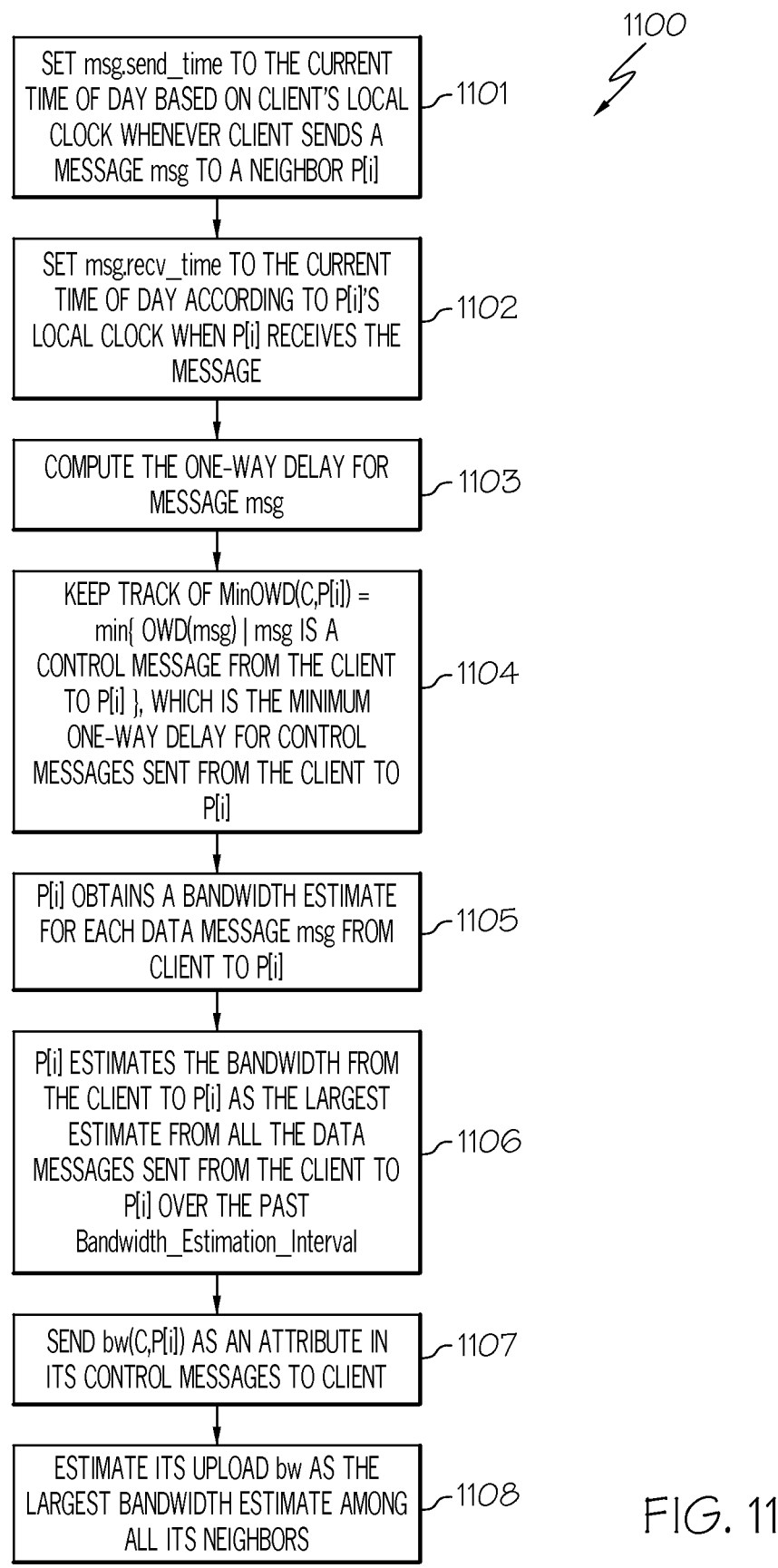
FIG. 11 is a flowchart of a method for estimating the bandwidth of a client in accordance with an embodiment of the present invention.
Figure 12:
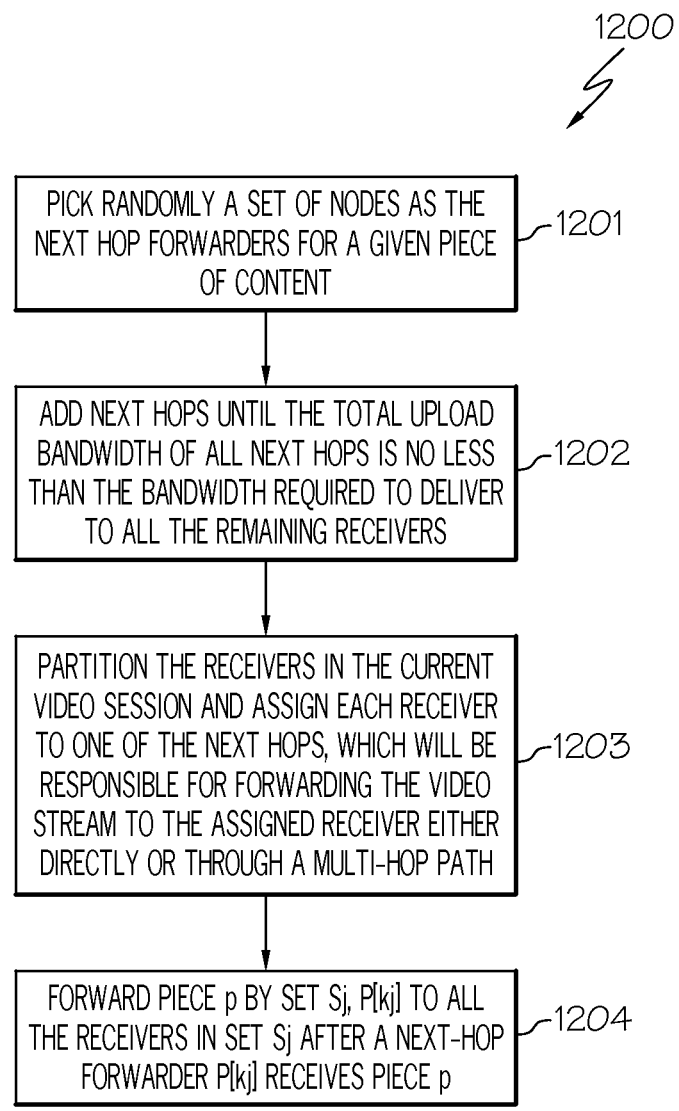
FIG. 12 is a flowchart of a method for reducing the network delay using random tree pushing in accordance with an embodiment of the present invention.

The principles of the present invention provide a means for more efficiently distributing video content over the Internet, involving live video streaming, video on demand and video conferencing, using a combination of a peer-to-peer network and a content distribution network as discussed further below in connection with FIGS. 1-11. FIG. 1 illustrates a network system that combines the use of a peer-to-peer network with a content distribution network to efficiently distribute video content. FIG. 2 is a hardware configuration of a client device in the network system. FIG. 3 is a flowchart of a method for joining an existing live streaming channel. FIG. 4 is a flowchart of a method for leaving an existing live streaming channel. FIG. 5 is a flowchart of a method for adding a new neighbor in a peer-to-peer network by issuing a new connection request. FIG. 6 is a flowchart of a method for handling the connection request discussed in FIG. 5. FIG. 7 is a flowchart of a method for removing a new neighbor in a peer-to-peer network. FIG. 8 illustrates a video buffer of the client device. FIG. 9 is a flowchart of a method for randomly selecting seed clients. FIG. 10 is a flowchart of a method for injecting pieces from the content source when the peer has insufficient upload bandwidth. FIG. 11 is a flowchart of a method for estimating the bandwidth of a client. FIG. 12 is a flowchart of a method for reducing the network delay using random tree pushing.

Referring now to the Figures in detail, as stated above, FIG. 1 illustrates a network system 100 that combines the use of a peer-to-peer network 101 with a content distribution network that uses one or more content distribution network servers 102 in accordance with an embodiment of the present invention. A peer-to-peer network 101 refers to distributing the tasks or workloads among peers (represented by clients 103A-103E in network 101) forming what is referred to as a network of nodes (where each node is represented by one of clients 103A-103E). Clients 103A-103E may collectively or individually be referred to as clients 103 or client 103, respectively. In a peer-to-peer network 101, peers or clients 103 make a portion of their resources, such as processing power, disk storage or network bandwidth, directly available to other network participants, without the need for central coordination by servers or stable hosts. In the context of the video distribution network of the present invention, peers or clients 103 make a portion of their resources available to upload video content to other peers or clients 103 in peer-to-peer network 101 (e.g., represented by the interconnections of clients 103 among themselves in peer-to-peer network 101) as discussed in greater detail further below.

A content distribution network, on the other hand, refers to a system of computers containing copies of data places at various nodes (represented by server 102) of a network 100. In the context of the video distribution network of the present invention, content distribution network server 102 stores video which may be downloaded by clients 103 (e.g., represented by the connection between clients 103D, 103E and content distribution network server 102).

As a result, clients 103 may download video content from either content distribution network server 102 or from another client 103 via peer-to-peer network 101. Initially, only content distribution network server 102 may have the video content desired by client 103. Client 103 can then only download the video content from content distribution network server 102. Later, such content may be distributed among other clients 103 in peer-to-peer network 101 thereby allowing such content to be downloaded from a client 103 within peer-to-peer network 101 instead of from content distribution network server 102. A more detail description of the hardware configuration of client 103 is discussed further below in connection with FIG. 2.

Network 100 further includes a tracker 104, which is a computing unit configured to keep track of the active clients 103 in peer-to-peer network 101 (e.g., represented by the connection between clients 103A, 103B and tracker 104) and informs a new client 103 of what other clients 103 it should connect to and download content from as discussed in further detail below.

Client 103 may be any type of device (e.g., portable computing unit, personal digital assistant (PDA), smartphone, desktop computer system, workstation, Internet appliance and the like) configured with the capability of communicating with other clients 103, server 102 and tracker 104.

While network 100 of FIG. 1 illustrates a single peer-to-peer network 101 comprising five peers or clients 103 as well as a single content distribution network server 102, network 100 may include any number of peer-to-peer networks 101 comprised of any number of clients 103 as well as any number of servers 102 for the content distribution network. Furthermore, the interconnections between clients 103 among themselves as well as between content distribution network server 102 and tracker 104 are illustrative. The principles of the present invention are not to be limited in scope to the topology depicted in FIG. 1.

As discussed above, FIG. 2 illustrates a hardware configuration of a client 103 which is representative of a hardware environment for practicing the present invention. Referring to FIG. 2, claim 103 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, an application for efficiently distributing video content as discussed further below in connection with FIGS. 3-12.

Referring again to FIG. 2, read-only memory ("ROM") 205 is coupled to system bus 202 and includes a basic input/output system ("BIOS") that controls certain basic functions of client 103. Random access memory ("RAM") 206 and disk adapter 207 are also coupled to system bus 202. It should be noted that software components including operating system 203 and application 204 may be loaded into RAM 206, which may be client's 103 main memory for execution. Disk adapter 207 may be an integrated drive electronics ("IDE") adapter that communicates with a disk unit 208, e.g., disk drive. It is noted that the program for efficiently distributing video content as discussed further below in association with FIGS. 3-12, may reside in disk unit 208 or in application 204.

Client 103 may further include a communications adapter 209 coupled to bus 202. Communications adapter 209 may interconnect bus 202 with an outside network thereby enabling client 103 to communicate with other similar devices.

I/O devices may also be connected to client 103 via a user interface adapter 210 and a display adapter 211. Keyboard 212, mouse 213 and speaker 214 may all be interconnected to bus 202 through user interface adapter 210. Data may be inputted to client 103 through any of these devices. A display monitor 215 may be connected to system bus 202 by display adapter 211. In this manner, a user is capable of inputting to client 103 through keyboard 212 or mouse 213 and receiving output from client 103 via display 215 or speaker 214.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As discussed above, video traffic over the Internet may be broadly classified into three categories: (1) live video streaming; (2) video on demand; and (3) video conferencing. In connection with live video streaming, clients 103 may establish and manage its own peer-to-peer network topology using the principles of the present invention as discussed below in connection with FIGS. 3-7.

FIG. 3 is a flowchart of a method 300 for joining an existing live streaming channel in accordance with an embodiment of the present invention.

Referring to FIG. 3, in conjunction with FIGS. 1 and 2, in step 301, client 103 sends a request to tracker 104 to join an existing live streaming channel.

In step 302, client 103 receives a list of active peers in the live streaming channel. In one embodiment, tracker 104 may take into account the geographical location of client 103 in deciding which subset of peers/clients 103 to provide to the requesting client 103.

In step 303, client connects to a random subset of peers provided by tracker 104 to become neighbors in its own peer-to-peer network 101. That is, after client 103 receives a list of N peers from tracker 104, client 103 connects to a random subset of K peers to become their neighbors in peer-to-peer network 101. To prevent peers from forming overly dense clusters, K is chosen as $K=\min\{N^{Topology\_Exponent}, Min\_Node\_Degree\}$, where Topology_Exponent and Min_Node_Degree are configurable parameters. Min_Node_Degree is a configurable parameter referring to the minimum number of nodes to be connected in peer-to-peer network 101 by client 103 for ensuring that peer-to-peer network 101 is well-connected so that "pieces" (a portion of the video content), discussed further below, can propagate quickly (e.g., Min_Node_Degree=10). In one embodiment, Topology_Exponent ranges from 0.5 to 1.

In step 304, client 103 determines whether the number of peers received by tracker 104 is less than a threshold number, Min_Peer_Number. In one embodiment, $Min\_Peer\_Number=Min\_Node\_Degree^{(1/Topology\_Exponent)}$. If the number of peers returned by tracker 104 is less than Min_Peer_Number, then, in step 305, client 103 requests periodically from tracker 104 more peers to form part of client's 103 peer-to-peer network 101. Additionally, client 103 may discover more peers in the live streaming channel by exchanging peer information with its neighbors.

If, however, the number of peers returned by tracker 104 is not less than Min_Peer_Number, then, in step 306, client 103 does not request from tracker 14 more peers to form part of client's 103 peer-to-peer network 101.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

In connection with client 103 leaving an existing live streaming channel, the following method is performed.

FIG. 4 is a flowchart of a method 400 for leaving an existing live streaming channel in accordance with an embodiment of the present invention.

Referring to FIG. 4, in conjunction with FIGS. 1 and 2, in step 401, client sends a leave notification message to tracker 104.

In step 402, client 103 disconnects all its neighbors in its peer-to-peer network 101.

In step 403, tracker 104 removes client 103 from its list of active peers whenever it receives a leave notification message from client 103 or when it fails to receive any keep-alive message from client 103 for Peer_Keep_Alive_Interval seconds (where Peer_Keep_Alive_Interval is a configurable parameter) (e.g., Peer_Keep_Alive_Interval is 30 seconds). In one embodiment, client 103 periodically sends keep-alive messages to inform tracker 104 that it is alive and the number of extra neighbors 103 is willing to accept.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

In connection with client 103 adding a new neighbor in its peer-to-peer network 101 in the context of live streaming, the following method is performed.

FIG. 5 is a flowchart of a method 500 for adding a new neighbor in a peer-to-peer network 101 by issuing a new connection request in accordance with an embodiment of the present invention.

Referring to FIG. 5, in conjunction with FIGS. 1 and 2, in step 501, a determination is made as to whether the number of neighbors in client's 103 peer-to-peer network 101 is below a threshold. In one embodiment, the threshold $K=\min(N^{Topology\_Exponent}, Min\_Node\_Degree)$, where N is the total number of peers that client 103 currently knows (i.e., the number of peers in client's 103 peer-to-peer network 101). In one embodiment, Max_Node_Degree is chosen to ensure that the control overhead (due to e.g., the keep-alive messages) is not too burdensome. For example, Max_Node_Degree may be set to equal 15.

If the number of neighbors client 103 knows is below a threshold, then, in step 502, client 103 periodically tries to increase its number of neighbors by connecting to more peers.

If, however, the number of neighbors in client's 103 peer-to-peer network 101 is not below a threshold, then, in step 503, client 103 does not attempt to connect to more peers and reject all subsequent connection requests from peers.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

FIG. 6 is a flowchart of a method 600 for handling the connection request discussed in method 500 in accordance with an embodiment of the present invention.

Referring to FIG. 6, in conjunction with FIGS. 1, 2 and 5, in step 601, client 103 receives a connection request as discussed in connection with method 500. In step 602, a determination is made as to whether the number of neighbors in client's 103 peer-to-peer network 101 is below a threshold. In one embodiment, Max_Node_Degree is chosen to ensure that the control overhead (due to e.g., the keep-alive messages) is not too burdensome. For example, Max_Node_Degree may be set to equal 15.

If the number of neighbors client 103 knows is below a threshold, then, in step 603, client 103 accepts the peer's connection request. Otherwise, in step 604, client 103 does not accept the peer's connection request.

In some implementations, method 600 may include other and/or additional steps that, for clarity, are not depicted. Further, in some implementations, method 600 may be executed in a different order presented and that the order presented in the discussion of FIG. 6 is illustrative. Additionally, in some implementations, certain steps in method 600 may be executed in a substantially simultaneous manner or may be omitted.

In connection with removing an existing neighbor in its peer-to-peer network 101 in the context of live streaming, the following method is performed.

FIG. 7 is a flowchart of a method 700 for removing a new neighbor in a peer-to-peer network 101 in accordance with an embodiment of the present invention.

Referring to FIG. 7, in conjunction with FIGS. 1 and 2, in step 701, client 103 determines if a peer is considered dead. "Dead," as used herein, refers to a client 103 acting as a peer that does not provide a keep-alive message over a duration of time. In one embodiment, client 103 and its neighbors in its peer-to-peer network 101 periodically exchange keep-alive messages to inform each other that they are alive (e.g., once per second). In one embodiment, a neighbor is considered dead if no keep-alive message from the peer is received over the past Neighbor_Keep_Alive_Interval seconds (where Neighbor_Keep_Alive_Interval is a configurable parameter; e.g., Neighbor_Keep_Alive_Interval=20 seconds).

If a peer is considered dead, then, in step 702, client 103 removes the peer from its peer-to-peer network 101.

If, however the peer is not considered dead, then, in step 703, client 103 determines if the performance of the peer is unsatisfactory. For example, the rate of loss video content between the peer and client 103 is deemed to be too high. In another example, the bandwidth of the peer is too low. In a further example, the response time of the peer is too slow.

If the performance of the peer is deemed to be unsatisfactory, then, in step 702, client 103 removes the peer from its peer-to-peer network 101.

If, however, the performance of the peer is not deemed to be unsatisfactory, then client 103 continues to determine if a peer is considered dead in step 701.

In some implementations, method 700 may include other and/or additional steps that, for clarity, are not depicted. Further, in some implementations, method 700 may be executed in a different order presented and that the order presented in the discussion of FIG. 7 is illustrative. Additionally, in some implementations, certain steps in method 700 may be executed in a substantially simultaneous manner or may be omitted.

While the previous discussion of FIGS. 3-7 were directed to live video streaming, the principles of the present invention discussed in connection with FIG. 3-7 may be applied to the other categories of video traffic, namely, video on demand and video conferencing.

As discussed above, video traffic over the Internet may be broadly classified into three categories: (1) live video streaming; (2) video on demand; and (3) video conferencing. For all such cases of video traffic, the principles of the present invention divide the video content into what are called herein as "pieces." Each piece may last for a designated period of time, which is represented by the parameter, Piece_Duration. Piece_Duration is a configurable parameter (for example, Piece_Duration=0.25 second). In one embodiment, each piece contains a timestamp that specifies the offset of the piece within a video stream.

In one embodiment, each client 103 divides its video buffer into the following four parts as shown in FIG. 8. FIG. 8 illustrates a video buffer 800 in accordance with an embodiment of the present invention.

Referring to FIG. 8, in conjunction with FIG. 1, video buffer 800 comprises a back buffer 801 storing what is referred to herein as the "back buffer pieces." In one embodiment, back buffer 801 stores recently played pieces. Back buffer 801 may provide pieces for any peer whose play point is less than the current client's 103 play point. For live streaming and video conferencing, the size of back buffer 801, represented by the parameter, Back_Buffer_Size, is typically small (e.g., a few seconds). For video on demand, Back_Buffer_Size can be 5-10 minutes or even longer (if there is enough memory available). In one embodiment, it may be desirable to keep Back_Buffer_Size below 10 minutes so as to it make it possible to support high-definition videos, which have much higher data rates and thus impose much higher memory requirement. To further reduce buffer requirement, one may keep a random fraction of recently played pieces as will be discussed in further detail below in connection with buffer management for video on demand.

Video buffer 800 further includes a source protection window 802. Source protection window 802 contains pieces whose deadlines (that is, scheduled play times) are within Source_Protection_Window_Size (parameter representing the size of source protection window 802) pieces from the current play point 803. To assure the quality of video streaming, any missing piece in source protection window 802 will be fetched directly from the content source, such as content distribution network server 102. In one embodiment, Source_Protection_Window_Size is set to be very small (typically a few seconds) to minimize the amount of content directly served by the original source, such as content distribution network server 102.

Video buffer 800 additionally includes a window of time, referred to herein as the urgent window 804. Urgent window 804 contains pieces whose deadlines (that is, scheduled play times) are within Urgent_Window_Size (parameter representing the size of urgent window 804) pieces after the end of source protection window 802. Missing pieces in urgent window 804 are fetched from neighbors in an earliest-deadline-first fashion as discussed in further detail below. In one embodiment, the Urgent_Window_Size typically lasts for only a few seconds.

Additionally, video buffer 800 includes a window of time, referred to herein as the front buffer 805. Front buffer 805 contains pieces whose deadlines (that is, scheduled play times) are within Front_Buffer_Size (parameter representing the size of front buffer 805) pieces after the end of urgent window 804. Missing pieces in front buffer 805 are fetched both from the content source, such as content distribution network server 102 (using the direct content injection algorithm described below), and from neighboring clients 103 (using the piece scheduling algorithm described below). In one embodiment, for live streaming, Front_Buffer_Size lasts for only a few seconds; for video conferencing, Front_Buffer_Size only lasts for no more than a second; for video on demand, the size of the Front_Buffer_Size depends on the largest play point difference between client 103 and all its neighbors. A discussion as to how to choose Front_Buffer_Size for video on demand is provided further below.

Video buffer 800 is maintained as a sliding window. That is, as play point 803 moves forward, the entire buffer shifts forward accordingly. All missing pieces inside source protection window 802 will be fetched directly from the content source; missing pieces in urgent window 804 will only be fetched from peers; missing pieces in front buffer 805 will be fetched from both the content source and from the peers. The details for determining which piece to next fetch are provided below in connection with the "piece scheduling algorithm." Furthermore, the details for determining from which peer to request a missing piece is discussed further below in connection with the "peer selection algorithm."

Referring again to FIG. 8, in conjunction with FIG. 1, different scheduling algorithms are used to decide which missing piece to next fetch based on which part of video buffer 800 contains the missing piece.

When the missing piece is in front buffer 805, the missing piece is fetched from neighboring clients 103 in a rarest-latest-first fashion. Specifically, a client 103 computes Count (p), the number of clients 103 within client's 103 1-hop neighborhood that already have piece p. The missing pieces are then sorted in ascending order of Count(p) (thus, "rarest first" is used as the primary order), and when multiple pieces have the same Count(p)), they are sorted in descending order of their timestamps (thus, "latest first" is used to break ties).

When the missing piece is in urgent window 804, the missing piece is fetched from neighboring clients 103 in an earliest-deadline-first fashion. Specifically, the missing pieces with the earliest scheduled play time are fetched first. In one embodiment, with probability Urgent_Window_Probability, missing pieces in urgent window 804 are fetched before missing pieces in front buffer 805 are fetched; with probability 1—Urgent_Window_Probability, missing pieces in front buffer 805 are fetched before missing pieces in urgent window 804 are fetched. In one embodiment, Urgent_Window_Probability is a configurable parameter between 0 and 1 that controls the relative importance of urgent window 804 versus front buffer 805. In one embodiment, Urgent_Window_Probability=1.

In the scenario when the same piece is available at multiple peers, the peers with a higher bandwidth, low latency are more preferable. Specifically, let P[k1], P[k2], . . . , P[ku] be the set of peers that own a piece p. Client 103 selects a random peer with a probability proportional to their upload bandwidth to request the piece p. In one embodiment, the peer can be selected by computing randomized weights W[ki]=log (uniform(P[ki], C, p))/bw[ki] and finding the peer with the largest randomized weights W[ki], where C designates a client 103 and bw designates a bandwidth. Moreover, client 103 does not fetch from a neighbor when the neighbor's predicted response time is too high compared with the deadline (i.e., scheduled play time) for a given piece.

As previously discussed, there are times when the content needs to be provided or "injected" from the content source, such as content distribution network server 102. For example, missing pieces in source protection window 802 will be fetched directly from the content source. Also, missing pieces in front buffer 805 may be fetched from the content source using the direct content injection algorithm as discussed below.

There are three main scenarios in which it is useful to directly inject video content from the content source, such as content distribution network server 102, into clients 103. A piece needs to be first injected from the content source into a subset of clients 103, which are called "seed clients" for the piece herein, before it can be further disseminated among all the clients 103 in a peer-to-peer fashion. When a piece propagates too slowly due to insufficient peer upload bandwidth, the content source needs to inject pieces into more clients 103 and help increase the total upload bandwidth and thus improve the dissemination speed. Furthermore, when a piece is about to miss its deadline (i.e., a scheduled play time) at a client 103, client 103 should directly fetch the piece from the content source in order to assure high video quality. In this manner, the amount of video content serviced directly by the content source, such as content distribution network server 102, is minimized while assuring high video quality for all clients 103.

Pieces inside source protection window 802 have immediate deadlines (i.e., a scheduled play time). To assure high video quality, any missing piece inside source protection window 802 is fetched directly from the content source in an earliest-deadline-first fashion. That is, missing pieces with the earliest scheduled play times are fetched first.

Whenever a new piece becomes available, a subset of seed clients will fetch the piece directly from the content source. These seed clients can then further disseminate the piece to other clients 103 in a peer-to-peer fashion. In one embodiment, a configurable parameter Seed_Client_Fraction is used to specify the desired fraction of seed clients (e.g., Seed_Client_Fraction=5%). To achieve load balancing, the seed clients for each piece are chosen randomly with probabilities proportional to their upload bandwidth (estimated using the bandwidth estimation algorithm as discussed further below). To avoid global coordination, the following distributed randomized seed client selection algorithm (method 900) is used as discussed in conjunction with FIG. 9.

FIG. 9 is a method 900 for randomly selecting seed clients in accordance with an embodiment of the present invention.

Referring to FIG. 9, in conjunction with FIGS. 1 and 8, in step 901, client 103 periodically receives information about their neighbor lists and their estimated upload bandwidth. In this way, client 103 can discover all the neighbors/peers within its H-hop neighborhood (i.e., the peers whose shortest path distance to client 103 in its peer-to-peer network 101 is at most H). To reduce control overhead, H can be set to a relatively small value (e.g., H=1 or 2).

In step 902, client 103 computes a randomized weight for the upload bandwidth of its neighbors. Let the discovered peers be: P[1], P[2] . . . , P[n]. Let the upload bandwidth for peer P[k] be bw[k]. For convenience, let P[0]=C (client 103) and bw[0] be the upload bandwidth for C. For a given piece with timestamp p, for each k=0, 1, . . . , n, C computes a randomized weight $$W[k]=\log(\text{uniform}(P[k], C, p))/bw[k],$$

where uniform(P[k], C, p) returns a pseudo random number uniformly distributed between 0 and 1 by using tuple (P[k], C, p) as the random seed for the pseudo random number generator.

In step 903, client 103 selects the seed clients based on the computed randomized weight. Client 103 selects itself to become a seed node for a piece if and only if its own random weight W[0] is among (1+n)*Seed Client Fraction largest values in the entire set of random weights {W[k]|k=0, 1, . . . ,n}. Note that the choice of random weights ensures that the probability for W[i]>W[j] is equal to bw[i]/(bw[i]+bw[j]) for any i≠j. Hence the probability for W[k] to be among the (1+n)*Seed_Client_Fraction largest weights is proportional to bw[k].

In some implementations, method 900 may include other and/or additional steps that, for clarity, are not depicted. Further, in some implementations, method 900 may be executed in a different order presented and that the order presented in the discussion of FIG. 9 is illustrative. Additionally, in some implementations, certain steps in method 900 may be executed in a substantially simultaneous manner or may be omitted.

When there exists the situation of a peer not having sufficient upload bandwidth, client 103 performs the following method to inject the missing pieces from the content source, such as content distribution network server 102.

FIG. 10 is a method 1000 for injecting pieces from the content source when the peer has insufficient upload bandwidth in accordance with an embodiment of the present invention.

Referring to FIG. 10, in conjunction with FIGS. 1 and 8, in step 1001, client 103 exchanges piece availability via a bitmap with other neighbors/peers in peer-to-peer network 101. In one embodiment, neighbors periodically exchange bitmaps that summarize piece availability in their video buffers 800 once every Bitmap_Exchange_Interval seconds (where Bitmap_Exchange_Interval is a configurable parameter). In one embodiment, a bitmap refers to a binary vector where a "one" indicates a piece is available and a "zero" indicates a piece is missing. The bitmap also contains the current play point information (i.e., play point 803). In addition, bitmaps may be piggybacked to any piece request message or data message exchanged among peers. To reduce communication overhead, the complete bitmap may only be exchanged when the Bitmap_Exchange_Timer expires periodically. During the interval after the Bitmap_Exchange_Timer expires and before it expires again, all control and data messages only specify changes to the most recent complete bitmap.

In step 1002, client 103 computes the per-piece bandwidth deficit. Let P[1], P[2] . . . , P[n] be client's 103 direct neighbors. Let P[0]=C (C, referring to client 103). Let the upload bandwidth for P[k] be bw[k]. Let BW=bw[0]+bw[1]+ . . . + bw[n] be the total upload bandwidth within the 1-hop neighborhood of C. For a given piece with timestamp p, let Count (p) be the number of clients in set {P[k]|k=0, 1, . . . ,n} that already have the piece. Let Data Rate be the data rate of the video stream. The bandwidth deficit for piece p can then be computed as Deficit(p)=(1+n−Count(p))*Data_Rate−BW, where (1+n−Count(p))*Data_Rate represents the total demand for downloading, and BW represents the total supply of upload bandwidth. It is noted for clarity that the per-piece bandwidth deficit can be either positive or negative. When Deficit(p) is positive, it indicates that p has insufficient upload bandwidth. In this manner, each client 103 determines which pieces cannot be provided by a peer due to insufficient upload bandwidth thereby requiring direct injection from the content source. When Deficit(p) is negative, it indicates that p has more upload bandwidth than what is needed for disseminating piece p. Such surplus bandwidth can then be used to disseminate other pieces.

In step 1003, client 103 computes the cumulative bandwidth deficit. In order to efficiently utilize all the surplus bandwidth and minimize the distinct number of pieces that require direct injection from the content source, client 103 first sorts all the pieces in a rarest-latest-first fashion. Specifically, client 103 sorts pieces in ascending order of Count(p) (thus, "rarest first" is used as the primary order), and when multiple pieces have the same Count(p)), sort such pieces in descending order of their timestamps (thus, "latest first" is used to break ties). Let the sorted pieces be p1, p2, . . . , pm. Sorting in rarest-latest-first order ensures that p1 has the highest per-piece deficit and pm has the lowest per-piece deficit. For each piece pj, client 103 then computes the cumulative bandwidth deficit.

In step 1004, client 103 determines if the cumulative bandwidth deficit is positive. Whenever the cumulative bandwidth deficit is positive, client 103, in step 1005, computes the inject count, Inject_Count(pj), i.e., the number of copies pj needs to be injected from the content source into client's 103 1-hop neighborhood, using the following algorithm (AG 1):

```
cum_deficit = 0
for j = m down to 1
    cum_deficit = cum_deficit + Deficit(p_j)
    if (cum_deficit > 0)
        Inject_Count(p_j) = cum_deficit / Data_Rate
        cum_deficit = 0
    else
        Inject_Count (p_j) = 0
    end if
end for
```

All pieces with Inject_Count(pj)>0 require direct injection inside client's 103 1-hop neighborhood.

If, however, the cumulative deficit is not positive, then, in step 1006, client 103 does not need to inject pieces from the content source, such as content distribution network server 102.

Returning to step 1005, client 103, in step 1007, selects the peers within client's 103 1-hop neighborhood that need to directly inject pj from the content source, such as content distribution network server 102. It is noted that Inject_Count (pj) only specifies the total number of additional clients within client's 103 1-hop neighborhood that need to directly inject pj from the content source. It does not specify which client 103 needs to inject piece pj. In order for client 103 to determine whether itself is one of these clients who need to inject piece pj, client 103 applies the same distributed, randomized seed client selection algorithm described above. Specifically, client 103 first computes randomized weights W[k]=log(uniform(P[k], C, pj))/bw[k], where uniform(P[k], C, pj) returns a pseudo random number uniformly distributed between 0 and 1 by using tuple (P[k], C, pj) as the random seed. Client 103 then decides to inject piece pj if and only if W[0] is among the top Inject_Count(pj) largest weights among all the W[k] (k=0, 1, . . . , n). When client 103 decides to inject more than one piece, it fetches them from the content source in a rarest-latest-first fashion.

In some implementations, method 1000 may include other and/or additional steps that, for clarity, are not depicted. Further, in some implementations, method 1000 may be executed in a different order presented and that the order presented in the discussion of FIG. 10 is illustrative. Additionally, in some implementations, certain steps in method 1000 may be executed in a substantially simultaneous manner or may be omitted.

In order to ensure that the peers are not overloaded in uploading video traffic to other peers in peer-to-peer network 101, the following is applied.

Upload traffic sending rate may have to be throttled, because otherwise there can be significant queue buildup, which can cause excessive network delay and even packet losses. A standard token bucket may be used to limit the delay and burstiness of the upload data traffic. In one embodiment, the control traffic has a higher priority and is not subject to the rate limiting. Not throttling control traffic is reasonable because control traffic rate is low and will not cause congestion in general. Moreover, most control traffic requires low delay in order to be effective and cannot be queued after data traffic. By rate limiting the upload traffic, creating long queues in a large hidden buffer (e.g., upstream of a digital subscriber line or a cable modem link) may be avoided.

In one embodiment, the token bucket has the following configurable parameters:

(i) Token_Generation_Rate=Upload_BW, which limits the average upload traffic rate;

(ii) Token_Bucket_Capacity=Upload_BW*Token_Bucket_Max_Burst_Delay, which limits the maximum burst size (and thus the queueing delay at the true bottleneck). Token_Bucket_Max_Burst_Delay is typically set to a small value (e.g., 200 milliseconds) to avoid sending a large burst of data packets into the network, which may overflow router buffers; and (iii) When there is insufficient token available, the packet is entered into a queue, which has capacity Queue_Capacity=Upload_BW*Token_Bucket_Max_Queue_Delay. The queue length affects the maximum end-to-end delay. When the queue is full, the packet is dropped and an explicit loss notification message is sent to the neighbor who requests the data. Token_Bucket_Max_Queue_Delay is also kept relatively small (e.g., 500 milliseconds) to minimize end-to-end delay. For video conferencing, which has a more stringent delay requirement, Token_Bucket_Max_ Queue_Delay can be further reduced to minimize end-to-end latency.

In order to ensure that clients 103 are not overloaded in downloading video traffic from other peers in peer-to-peer network 101 or from the content source, the following is applied.

Since traffic may be downloaded either from the content source or another client 103 and the content source may be out of our direct control, download traffic cannot be directly controlled. Instead, the request rate generated from a peer is throttled, which in turn throttles the download traffic since traffic is downloaded in response to requests. An Additive Increase Multiplicative Decrease (AIMD) scheme is used to adjust the Request_Quota for each peer. Request_Quota refers to a configurable parameter that specifies a limit as to the number of pieces that may be downloaded over a period of time.

In the AIMD scheme, the first part of the scheme is referred to as the additive increase. Specifically, when (i) a piece is successfully downloaded from a neighbor P, and (ii) the current number of unanswered requests for neighbor P is greater than Request_Quota(P)−1, client 103 increases Request_Quota(P) to Request_Quota(P)+AIMD_Alpha/Request_Quota(P). The second condition essentially states that Request_Quota(P) is saturated. AIMD_Alpha is a configurable parameter that controls the speed of additive increase. In one embodiment, AIMD_Alpha=1.In addition, Request_Quota(P) is upper bounded by the bandwidth-delay product BW(P)*RTT, where BW(P) is the estimated upload bandwidth of peer P, and RTT is the estimated round-trip-time between the current client 103 and neighbor P.

The second part of the AIMD scheme involves the multiplicative decrease. When either (i) an unanswered request is timed out, or (ii) an explicit loss notification message is received from P (generated when P is rate limiting its upload traffic), Request_Quota(P) is reduced to Request_Quota(P)* AIMD_Beta. In one embodiment, AIMD_Beta is a configurable parameter between 0 and 1 that controls the speed of multiplicative decrease. In one embodiment, AIMD_Beta=½.In one embodiment, Request_Quota(P) is lower bounded by 1.

To further control congestion using the network architecture of network 100, the number of concurrent downloads from the content source, such as content distribution network server 102 may be limited. In order to avoid overloading the content source, each client 103 limits the number of concurrent downloads from the content source by the parameter Source_Concurrent_Download_Limit. In one embodiment, a possible choice of Source_Concurrent_Download_Limit is 6, because most modern browsers (e.g., Firefox®, Chrome®, Internet Explorer®, Safari®) limit the number of concurrent HTTP connections to 6 or higher.

As discussed above, the knowledge of network bandwidth at clients 103 is used for peer-to-peer network formulation as well as congestion control. Suppose client 103 has n neighbors P[1], P[2], . . . , P[n]. The following method is used to estimate BW(C): the total upload bandwidth of C, where C refers to a client 103.

FIG. 11 is a method 1100 for estimated the bandwidth of a client 103 in accordance with an embodiment of the present invention.

Referring to FIG. 11, in conjunction with FIG. 1, in step 1101, client 103 sets msg.send_time to the current time of day based on client's 103 local clock whenever client 103 sends a message msg (either data or control) to a neighbor P[i].

In step 1102, P[i] sets msg.recv_time to the current time of day according to P[i]'s local clock when P[i] receives the message of step 1001.

In step 1103, P[i] computes the one-way delay for msg as:

OWD(msg)=msg.recv_time−msg.send_time

Note that client's 103 local clock and P[i]'s local clock need not be synchronized. As a result, the absolute value of OWD(msg) may not be very meaningful. For example, the value of OWD(msg) may be negative. However, it is assumed that client's 103 and P[i]'s clocks will not drift apart too quickly. That is, the offset between client's 103 local time and P[i]'s local time stay roughly constant.

In step 1104, each neighbor P[i] keeps track of MinOWD (C,P[i])=min{OWD(msg)|msg is a control message from client 103 to P[i]}, which is the minimum one-way delay for control messages sent from client 103 to P[i]. Examples of a control message includes: a keep-alive message, a bitmap exchange message, a piece request message, an explicit loss notification message, etc.

In step 1105, for each data message msg from client 103 to P[i] with payload length msg.len, P[i] can obtain a bandwidth estimate as:

bw(msg)=msg.*len*/(OWD(msg)−MinOWD(*C,P[i]*)), where the denominator OWD(msg)−MinOWD(C, P[i]) represents an estimate of the time it takes to transmit the data contained in msg.

In step 1106, P[i] estimates the bandwidth from client 103 to P[i] as the largest estimate from all the data messages sent from client 103 to P[i] over the past Bandwidth_Estimation_Interval. That is, bw(C,P[i])=max{bw(msg)|msg is received in the past Bandwidth_Estimation_Interval}, where Bandwidth_Estimation_Interval is a configurable parameter with a sufficiently long duration (e.g., 10 minutes).

In step 1107, P[i] sends bw(C,P[i]) as an attribute in its control messages to client 103.

In step 1108, client 103 estimates its upload BW as the largest bandwidth estimate among all its neighbors. That is, BW(C)=max{bw(C,P[i])|i=1, 2, . . . , n}.

It is noted that MinOWD(C, P[i]) may be unreliable if there are not enough OWD samples. In particular, if MinOWD(C, P[i]) is overestimated, then the upload BW can be overestimated. To solve this problem, when the number of OWD samples is below a threshold, Min_OWD_Samples (e.g., 30), P[i] conservatively estimates BW based on the round-trip time: bw(msg)=msg.len/RTT(msg), where the round-trip time RTT(msg) is calculated as the lag between the time when a piece is requested by P[i] and the time when the response msg is received by P[i].

In some implementations, method 11000 may include other and/or additional steps that, for clarity, are not depicted.

Further, in some implementations, method 1100 may be executed in a different order presented and that the order presented in the discussion of FIG. 11 is illustrative. Additionally, in some implementations, certain steps in method 1100 may be executed in a substantially simultaneous manner or may be omitted.

As discussed above, video traffic over the Internet may be broadly classified into three categories: (1) live video streaming; (2) video on demand; and (3) video conferencing. While the above description related to live video streaming, the principles of the present invention discussed above may be applied to video on demand and video conferencing as discussed below.

In connection with supporting video on demand, the system of the present invention can be extended to support video on demand with the following modifications.

Referring to FIGS. 1 and 8, in live streaming, peer-to-peer network formation is performed according to network proximity. In video on demand, clients 103 differ not only in their proximity but also in their play points 803. Clients 103 that watch adjacent play points 803 can share the content more efficiently. Motivated by this observation, the peer-to-peer network formation algorithm discussed above in connection with FIGS. 3-7 is modified to take into account of both proximity and play points 803. Specifically, when a new client 103 joins the network, tracker 104 returns a list of nodes (referring to other clients 103 in network 100) whose play points 803 differ from the new client 103 within X-minute(s) and have a small network round-trip time to the new client 103 as the new client's 103 peers, where X is a configurable parameter (e.g., X=5 or 10 minutes). If there are too few clients 103 whose play points 803 are within X minutes, tracker 104 simply returns those clients 103 whose play points 803 are the closest to the new client's play point 803.

With respect to buffer management, the size of the front buffer needs to be configured differently. In live streaming, the Front_Buffer_Size (size of front buffer 805) is set to a relatively small value (e.g., a few seconds). For video on demand, the Front_Buffer_Size needs to be large enough so that client 103 that starts viewing the video later can fetch pieces that are not yet viewed by an earlier client 103. This can significantly improve the fraction of peer-delivered content especially when the later client 103 has higher upload bandwidth and other resources. The system of the present invention automatically selects the Front_Buffer_Size as follows:

Front_Buffer_Size($C$)=max{Min_FBS,
min{Max_FBS,max{Playpoint($P_k$)−Playpoint($C$)
|$P_k$ is a direct neighbor of $C$}}

This means that the Front Buffer Size(C) has a lower bound of Min_FBS and an upper bound of Max_FBS. The actual size of front buffer 805 is also determined by the largest difference between the neighbors' play point 803 and client 103's own play point 803. If all the neighbors play points 803 are behind the play point 803 of client 103, then client 103 only needs to buffer Min_FBS. Otherwise, client 103 needs to buffer possibly more data for its neighbor to download. In one embodiment, Min_FBS can be set to a small value (e.g., 10 seconds), and Max_FBS can be set to a larger value (e.g., 5-10 minutes).

With respect to managing back buffer 801, back buffer 801 stores pieces that have been recently played. So long as memory is available, one can make the size of back buffer 801 as large as possible. For example, when the application of the present invention runs inside a browser, it is often deemed safe when the entire video buffer consumes less than 50-70 MB. The Back_Buffer_Size (size of back buffer 801) should be made large enough to cover the maximum play point difference between neighbors. For example, if tracker 104 ensures the maximum play point difference is below 5-10 minutes, then back buffer 801 only needs to span 5-10 minutes.

Note that client 103 has the option to keep only a subset of pieces inside back buffer 801. For example, for each piece p inside back buffer 801, client 103 can generate a random number uniform(p, C), which is uniformly distributed between 0 and 1 and uses pair (p, C) as the random seed, where C represents client 103. Client 103 then only keeps a piece p when uniform(p, C) is below a configurable threshold Back_Buffer_Density (e.g., value between 0 and 1). In this way, the expected number of pieces occupied by back buffer 801 is only Back_Buffer_Size*Back_Buffer_Density. By reducing Back_Buffer_Density, back buffer 801 can span a wider time range without increasing the memory consumption. This technique is particularly useful for supporting high-definition videos where each piece may be very large. The technique is also useful for less popular videos, where play points 803 between neighbors may differ by much more than 5-10 minutes.

Finally, after client 103 starts playing for some time, its direct neighbor set may become sufficiently stable. This can happen when client's 103 neighbor count reaches the upper bound of Max_Node_Degree or when the neighbor set stops changing for Y minutes (e.g., Y=5-10). In this case, client 103 can adjust its back buffer size based on the maximum difference between neighbors' play points 803 and client's own play point 803. Specifically, one can set Back_Buffer_Size($C$) =
max{ Min_BBS,
min{ Max_BBS,
max{ Playpoint($C$) − Playpoint($P_k$) | $P_k$ is a direct neighbor of $C$ } }.

This means that Back_Buffer_Size(C) has a lower bound of Min_BBS and an upper bound of Max_BBS. The actual back buffer size is also determined by the largest difference between the neighbors' play point 803 and client's own play point 803. If all the neighbors play points 803 are before (i.e., greater than) play point 803 of client 103, then client 103 only needs to buffer Min_BBS. Otherwise, client 103 needs to buffer possibly more data for its neighbor to download. In one embodiment, Min_BBS can be set to a small value (e.g., 10 seconds), and Max_BBS can be set to a larger value (e.g., 5-10 minutes).

Furthermore, video on demand allows client 103 to perform a forward or backward seek operation. If after client 103 performs a forward or backward seek operation, the new play point 803 is still within Max_FBS from the neighbors' play points 803, then there is no need to change client's 103 neighborhood. The only thing it requires is for client 103 to readjust the Front_Buffer_Size(C) based on the new play point 803. Client 103 also needs to inform its neighbors of the new play points 803 so that the neighbors can adjust their Front_Buffer_Size accordingly. Finally, client 103 needs to inform tracker 104 of its new play point 803. On the other hand, a large change in client's play point 803 requires client 103 to (i) disconnect its existing neighbors, (ii) contact tracker 104 to obtain a new list of peers whose current play points 803 are close to client's 103 new play point 803, and (iii) connect to new neighbors.

In connection with supporting video conference, the system of the present invention can be extended to support video conferencing with the following modifications.

In comparison with live streaming, video conferencing has three key differences: (i) instead of having content source server(s), multiple participating clients 103 of the conference will generate video and audio data that need to be disseminated to a subset of participants. Hence, the communication is many-to-many (as opposed to one-to-many in the case of live streaming); (ii) video conferencing imposes much more stringent performance constraints on audio and video streams; and (iii) the number of participants in a video conference is typically much smaller than the number of clients 103 in a live streaming channel.

In order to support video conferencing, the principles of the present invention implement a pull-based approach and a push-based approach as discussed below.

Video conference can be considered as a special case of live streaming, where each participant publish their audio/video streams to conference server(s) 102, which in turn disseminates the audio/video streams to the other participants 103 who are interested in listening to or watching the streams. Therefore, the mechanism developed for live streaming can be directly applied to support video streaming. In this scheme, clients 103 need to actively pull (i.e., request) pieces from either peers or content source 102. This is referred to herein as the "pull-based approach."

In addition to applying the above mechanism to support video conferencing, an alternative scheme based on random tree pushing is developed to further reduce network delay. The goal of random tree based distribution scheme is to develop a shallow tree that has enough bandwidth to distribute the content to all the participants. The tree should be shallow since the network delay increases with the depth of the tree. One way is to optimize tree construction based on network topology and traffic. However, this requires up-to-date global information about the network topology and traffic and frequent adaptation to the changes in the topology and traffic. In order to achieve high efficiency without requiring global information or coordination, the following method (random tree based pushing) may be used as discussed below in connection with FIG. 12.

FIG. 12 is a method 1200 for reducing network delay using random tree pushing in accordance with an embodiment of the present invention.

Referring to FIG. 12, in conjunction with FIG. 1, in step 1201, the source client 103, who generates the audio/video stream, randomly picks a set of nodes (other clients 103) as the next hop forwarders for a given piece of content. Nodes are selected as next hops with a probability proportional to its upload bandwidth, since nodes with higher bandwidth should be preferred as forwarders.

In step 1202, the source client 103 keeps adding next hops until the total upload bandwidth of all next hops is no less than the bandwidth required to deliver to all the remaining receivers. More formally, let C be the source client and let $P[1]$, $P[2], \ldots, P[n]$ be the set of receivers. Let $bw[k]$ be the upload bandwidth of $P[k]$. Let p be a new piece to be disseminated. The source client C performs the following:
(i) C first computes randomized weights $W[k]=\log(\text{uniform}(P[k],C,p))/bw[k]$, where uniform($P[k]$,C,p) is a pseudo random number uniformly distributed between 0 and 1 and is generated with pair ($P[k]$, C) as the random seed; (ii) C sorts all the $P[k]$ in descending order of $W[k]$ (Let $P[k_1]$, $P[k_2], \ldots P[k_n]$ be the sorted nodes (so we have $W[k_1] \geq W[k_2] \geq \ldots \geq W[k_n]$)); and (iii) C finds the smallest m such that $bw[k_1]+ \ldots +bw[k_m] \geq (n-m)*\text{Data\_Rate}[C]$, where Data_Rate[C] is the data rate of the video stream generated by C. C then designate $P[k_1], \ldots, P[k_m]$ as its next-hop forwarders.

In step 1203, the source client 103 further partitions the receivers in the current video session and assigns each receiver to one of the next hops, which will be responsible for forwarding the video stream to the assigned receiver either directly or through a multi-hop path. The number of receivers assigned to the next hop is proportional to the next hop's bandwidth. For example, suppose there are 9 receivers and 2 next-hop forwarders: node A has 2 Mbps and node B has 1 Mbps. Node A is responsible for delivering to 6 receivers and node B is responsible for delivering to 3 receivers.

Formally, let $P[k_1], \ldots, P[k_m]$ be the set of m next-hop forwarders determined in step 1101. Let $P[k_{m+1}], \ldots, P[k_n]$ be the set of (n-m) receivers (i.e., non-forwarders). The source client 103 partitions the (n-m) receivers into m sets: $S_1, \ldots, S_m$, where the size of the set $S_j$ (j=1, \ldots, m) is proportional to $bw[k_j]$ and forwarder $P[k_j]$ is responsible for forwarding piece p to receivers in set $S_j$. The source client 103 then sends a data message to each forwarder $P[k]$, where the data message contains piece p as well as the set of receivers $S_j$. If the source client 103 does not have enough bandwidth to forward piece p to all the forwarders in a timely fashion, then client 103 has the option of forwarding a copy of piece p to the conference server(s) and let the conference server(s) forward piece p to some next-hop forwarders.

In step 1204, after a next-hop forwarder $P[k_j]$ receives piece p, set $S_j$, $P[k_j]$ can directly forward piece p to all the receivers in set $S_j$. Alternatively, it is possible for $P[k_j]$ to pick its own next-hop forwarders using the same probabilistic approach as in step 1201, and assigns the receivers to the forwarder as described in step 1203. This process is repeated recursively until the video reaches all the receivers.

Note that in the above steps, next-hop forwarders are selected from the current receivers interested in receiving video from the source client 103. Method 1200 can be easily extended to include other active users (who are not interested in watching client's 103 video stream) as candidate next-hop forwarders.

Also it is noted that the push-based scheme and the pull-based scheme are not mutually exclusive. They can be easily combined into a hybrid scheme. For example, pieces are primarily distributed using the push-based approach. Meanwhile, client 103 can request (i.e., pull) missing pieces from either its neighbors or the conference server (e.g., content distribution network server 102).

In some implementations, method 1200 may include other and/or additional steps that, for clarity, are not depicted. Further, in some implementations, method 1200 may be executed in a different order presented and that the order presented in the discussion of FIG. 12 is illustrative. Additionally, in some implementations, certain steps in method 1200 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A method for efficiently distributing video content, the method comprising:

requesting from a tracker unit to one of join an existing live streaming channel, join a video on demand streaming channel and join a video conference, wherein said tracker unit is configured to keep track of active peers in a peer-to-peer network;

receiving a list of active peers participating in one of said live streaming channel, said video on demand streaming channel and said video conference from said tracker unit;

connecting, by a processor, to a subset of peers in said list provided by said tracker unit to become neighbors in said peer-to-peer network; and receiving a missing piece of video content from one of said neighbors in said peer-to-peer network or from a content distribution network server based on where said missing piece of video content is to be stored in a video buffer;

wherein said video buffer comprises a back buffer, a source protection window, an urgent window and a front buffer, wherein said back buffer comprises recently played pieces of video content, wherein said source protection window comprises pieces of video content whose deadlines are within a first number of pieces from a current play point, wherein said urgent window comprises a second number of pieces of video content after an end of said source protection window, wherein said front buffer comprises a third number of pieces of video content after an end of said urgent window.

2. The method as recited in claim 1, wherein pieces of video content in said front buffer are later in time than pieces of video content in said urgent window which are later in time than pieces of video content in said source protection window which are later in time than pieces of video content in said back buffer.

3. The method as recited in claim 1, wherein missing pieces of video content in said source protection window are fetched from said content distribution network server.

4. The method as recited in claim 1, wherein missing pieces of video content in said urgent window are fetched from said neighbors in said peer-to-peer network in an earliest-deadline-first fashion.

5. The method as recited in claim 1, wherein missing pieces of video content in said front buffer are fetched from one of said content distribution network server and said neighbors in said peer-to-peer network.

6. The method as recited in claim 5, wherein said missing pieces of video content are fetched from said neighbors in said peer-to-peer network in a rarest-latest-first fashion.

7. The method as recited in claim 1, wherein a size of said front buffer is based on a difference between a neighbor's play point and a play point of a client.

8. The method as recited in claim 1 further comprising:
readjusting a size of said front buffer after performing one of a forward and a backward seek operation if a new play point is not within an upper bound limit of said front buffer.

9. A computer program product embodied in a non-transitory computer readable storage medium for efficiently distributing video content, the computer program product comprising the programming instructions for:

requesting from a tracker unit to one of join an existing live streaming channel, join a video on demand streaming channel and join a video conference, wherein said tracker unit is configured to keep track of active peers in a peer-to-peer network;

receiving a list of active peers participating in one of said live streaming channel, said video on demand streaming channel and said video conference from said tracker unit;

connecting to a subset of peers in said list provided by said tracker unit to become neighbors in said peer-to-peer network; and receiving a missing piece of video content from one of said neighbors in said peer-to-peer network or from a content distribution network server based on where said missing piece of video content is to be stored in a video buffer;

wherein said video buffer comprises a back buffer, a source protection window, an urgent window and a front buffer, wherein said back buffer comprises recently played pieces of video content, wherein said source protection window comprises pieces of video content whose deadlines are within a first number of pieces from a current play point, wherein said urgent window comprises a second number of pieces of video content after an end of said source protection window, wherein said front buffer comprises a third number of pieces of video content after an end of said urgent window.

10. The computer program product as recited in claim 9, wherein pieces of video content in said front buffer are later in time than pieces of video content in said urgent window which are later in time than pieces of video content in said source protection window which are later in time than pieces of video content in said back buffer.

11. The computer program product as recited in claim 9, wherein missing pieces of video content in said source protection window are fetched from said content distribution network server.

12. The computer program product as recited in claim 9, wherein missing pieces of video content in said urgent window are fetched from said neighbors in said peer-to-peer network in an earliest-deadline-first fashion.

13. The computer program product as recited in claim 9, wherein missing pieces of video content in said front buffer are fetched from one of said content distribution network server and said neighbors in said peer-to-peer network.

14. The computer program product as recited in claim 13, wherein said missing pieces of video content are fetched from said neighbors in said peer-to-peer network in a rarest-latest-first fashion.

15. The computer program product as recited in claim 9, wherein a size of said front buffer is based on a difference between a neighbor's play point and a play point of a client.

16. The computer program product as recited in claim 9 further comprising the programming instructions for:
readjusting a size of said front buffer after performing one of a forward and a backward seek operation if a new play point is not within an upper bound limit of said front buffer.

17. A system, comprising:
a memory unit for storing a computer program for efficiently distributing video content; and
a processor coupled to said memory unit, wherein said processor, responsive to said computer program, comprises
circuitry for requesting from a tracker unit to one of join an existing live streaming channel, join a video on demand streaming channel and join a video conference, wherein said tracker unit is configured to keep track of active peers in a peer-to-peer network;
circuitry for receiving a list of active peers participating in one of said live streaming channel, said video on demand streaming channel and said video conference from said tracker unit;
circuitry for connecting to a subset of peers in said list provided by said tracker unit to become neighbors in said peer-to-peer network; and
circuitry for receiving a missing piece of video content from one of said neighbors in said peer-to-peer network or from a content distribution network server based on where said missing piece of video content is to be stored in a video buffer;

wherein said video buffer comprises a back buffer, a source protection window, an urgent window and a front buffer, wherein said back buffer comprises recently played pieces of video content, wherein said source protection window comprises pieces of video content whose deadlines are within a first number of pieces from a current play point, wherein said urgent window comprises a second number of pieces of video content after an end of said source protection window, wherein said front buffer comprises a third number of pieces of video content after an end of said urgent window.

18. The system as recited in claim 17, wherein pieces of video content in said front buffer are later in time than pieces of video content in said urgent window which are later in time than pieces of video content in said source protection window which are later in time than pieces of video content in said back buffer.

19. The system as recited in claim 17, wherein missing pieces of video content in said source protection window are fetched from said content distribution network server.

20. The system as recited in claim 17, wherein missing pieces of video content in said urgent window are fetched from said neighbors in said peer-to-peer network in an earliest-deadline-first fashion.

21. The system as recited in claim 17, wherein missing pieces of video content in said front buffer are fetched from one of said content distribution network server and said neighbors in said peer-to-peer network.

22. The system as recited in claim 21, wherein said missing pieces of video content are fetched from said neighbors in said peer-to-peer network in a rarest-latest-first fashion.

23. The system as recited in claim 17, wherein a size of said front buffer is based on a difference between a neighbor's play point and a play point of a client.

24. The system as recited in claim 17, wherein said processor further comprises:

circuitry for readjusting a size of said front buffer after performing one of a forward and a backward seek operation if a new play point is not within an upper bound limit of said front buffer.

* * * * *